United States Patent
Andrianov et al.

(10) Patent No.: US 10,425,851 B2
(45) Date of Patent: Sep. 24, 2019

(54) DATA COLLECTION IN NETWORK MANAGEMENT LAYER COVERAGE AND CAPACITY OPTIMIZATION

(71) Applicant: NOKIA SOLUTIONS AND NETWORKS OY, Espoo (FI)

(72) Inventors: Anatoly Andrianov, Schaumburg, IL (US); Yi Zhi Yao, Beijing (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 61 days.

(21) Appl. No.: 14/894,218

(22) PCT Filed: May 28, 2014

(86) PCT No.: PCT/EP2014/061122
§ 371 (c)(1),
(2) Date: Nov. 25, 2015

(87) PCT Pub. No.: WO2014/191490
PCT Pub. Date: Dec. 4, 2014

(65) Prior Publication Data
US 2016/0105819 A1    Apr. 14, 2016

Related U.S. Application Data

(60) Provisional application No. 61/828,133, filed on May 28, 2013.

(51) Int. Cl.
*H04W 24/10* (2009.01)
*H04W 24/02* (2009.01)
(Continued)

(52) U.S. Cl.
CPC .......... *H04W 24/10* (2013.01); *H04W 24/02* (2013.01); *H04W 72/04* (2013.01); *H04W 16/18* (2013.01); *H04W 24/08* (2013.01); *H04W 88/02* (2013.01)

(58) Field of Classification Search
CPC ..... H04W 24/10; H04W 24/02; H04W 72/04; H04W 24/08; H04W 16/18; H04W 88/02
See application file for complete search history.

(56) References Cited

U.S. PATENT DOCUMENTS

2013/0035085 A1* 2/2013 Axell .................... H04W 24/10
455/419
2013/0208617 A1* 8/2013 Fukuta .................. H04W 24/08
370/252

(Continued)

FOREIGN PATENT DOCUMENTS

CN       102740327 A     10/2012
WO    2011/120585 A1     10/2011

(Continued)

OTHER PUBLICATIONS

International Search Report and Written Opinion dated Sep. 23, 2014, issued in corresponding PCT/EP2014/061122.

(Continued)

*Primary Examiner* — Qun Shen
(74) *Attorney, Agent, or Firm* — Squire Patton Boggs (US) LLP

(57) ABSTRACT

Various communication systems may benefit from methods, apparatuses, and systems for data collection. For example, wireless communication systems of the third generation partnership project (3GPP) may benefit from data collection in network management layer coverage and capacity optimization. For example, a method may include sending performance measurement job activation indicating that minimization of drive test data is to be collected (in an alternative, the job can be configured to indicate that non-MDT data is to be collected). The method may also include receiving performance measurements in response to the job activation.

17 Claims, 7 Drawing Sheets

(51) Int. Cl.
*H04W 72/04* (2009.01)
*H04W 16/18* (2009.01)
*H04W 24/08* (2009.01)
*H04W 88/02* (2009.01)

(56) References Cited

U.S. PATENT DOCUMENTS

| | | | | |
|---|---|---|---|---|
| 2013/0223233 A1* | 8/2013 | Zhao | ...................... | H04W 24/02 370/241.1 |
| 2013/0316722 A1* | 11/2013 | Bader | ................... | H04W 88/18 455/453 |
| 2014/0355484 A1* | 12/2014 | Foster | ................... | H04W 24/02 370/255 |
| 2015/0249932 A1* | 9/2015 | Racz | ...................... | H04W 24/08 370/252 |
| 2015/0296558 A1* | 10/2015 | Seo | ........................ | H04W 76/23 370/338 |
| 2016/0037371 A1* | 2/2016 | R Cz | ...................... | H04W 24/08 455/422.1 |

FOREIGN PATENT DOCUMENTS

| | | | | |
|---|---|---|---|---|
| WO | 2012/052398 A1 | 4/2012 | | |
| WO | WO 2012/047070 | * 4/2012 | ............ | H04W 24/08 |
| WO | 2013/066333 A1 | 5/2013 | | |
| WO | 2014/037289 A1 | 3/2014 | | |

OTHER PUBLICATIONS

3GPP TS 32.412 V11.1.0 (Dec. 2012), Technical Specification "3rd Generation Partnership Project; Technical Specification Group Services and System Aspects; Telecommunication management; Performance Management (PM) Integration Reference Point (IRP): Information Service (IS) (Release 11)"; Feb. 1, 2013 (Feb. 1, 2013), XP014093208 (68 pages).

3GPP TSG-SA5 (Telecom Management), Meeting SA5#72, Jul. 12-16, 2010, Bratislava, Slovakia; S5-101879; Jul. 4, 2010 (Jul. 4, 2010), XP050461139 (4 pages).

3GPP TR 32.827 V1.0.0 (Mar. 2010), Technical Report, "3rd Generation Partnership Project; Technical Specification Group Services and System Aspects; Telecommunication management; Integration of device management information with Itf-N (Release 9)" Mar. 15, 2010 (Mar. 15, 2010, XP050440210 (21 pages).

3GPP TR 32.836 V.1.3.0 (Feb. 2014), Technical Report, "3rd Generation Partnership Project; Technical Specification Group Services and System Aspects; Telecommunication management; Study on NM centralized Coverage and Capacity Optimization (CCO) SON function (Release 12)"; Feb. 26, 2014 (Feb. 26, 2014), XP050771989 (39 pages).

3GPP TS 32.600 V.10.0.0 (Jun. 2010), Technical Specification, 3rd Generation Partnership Project; Technical Specification Group Services and System Aspects; Telecommunication management; Configuration Management (CM); Concept and high-level requirements (Release 10); (21 pages).

3GPP TS 32.404 V8.4.0 (Sep. 2009), Technical Specification, 3rd Generation Partnership Project; Technical Specification Group Services and System Aspects; Telecommunication management; Performance Management (PM); Performance measurements—Definitions and template (Release 8); (27 pages).

3GPP TS 36.331 V8.0.0 (Dec. 2007), Technical Specification, 3rd Generation Partnership Project; Technical Specification Group Radio Access Network; Evolved Universal Terrestrial Radio Access (E-UTRA) Radio Resource Control (RRC); Protocol specification (Release 8); (56 pages).

European Office Action issued in corresponding European Application No. 14 727 473.2 dated May 3, 2018.

ETSI TS 132 422 V11.7.0 (Apr. 2013), Digital Cellular Telecommunications System (Phase 2+); Universal Mobile Telecommunications System (UMTS); LTE; Telecommunication Management; Subscriber and equipment trace; Trace control and configuration management (3GPP TS 32.422 Version 11.7.0 Release 11); 2013; 135 pages.

Chinese Office Action corresponding to Application No. 201480042610.6, dated May 23, 2018.

Chinese Office Action corresponding to Application No. 201480042610.6, dated Feb. 2, 2019.

* cited by examiner

DATA COLLECTION IN NETWORK MANAGEMENT LAYER COVERAGE AND CAPACITY OPTIMIZATION

CROSS-REFERENCE TO RELATED APPLICATION

The present application is related to and claims the benefit and priority of U.S. Provisional Patent Application No. 61/828,133, filed May 28, 2013, the entirety of which is hereby incorporated herein by reference.

BACKGROUND

Field

Various communication systems may benefit from methods, apparatuses, and systems for data collection. For example, wireless communication systems of the third generation partnership project (3GPP) may benefit from data collection in network management layer coverage and capacity optimization.

Description of the Related Art

Self-organizing networks (SON) network manager (NM) centralized coverage and capacity optimization (CCO) in third generation partnership project (3GPP) may relate to optimizing the coverage and capacity issues, based on the data, including measurements and events, reported from the network elements (NEs) via element manager (EM)/domain manager (DM).

The NM CCO use cases can include a downlink coverage map use case, a long term evolution (LTE) connection failure use case, cell coverage adapting to traffic demand use case, coverage and accessibility use case, LTE coverage holes with underlaid universal terrestrial radio access network (UTRAN)/global system for mobile communication (GSM) enhanced data rates for GSM evolution (EDGE) Radio Access Network (GERAN) use case, and a radio link quality use case.

The data to support NM CCO can include minimization of drive test (MDT) measurements, both UE and network side measurements, collected on a per-UE basis. The data to support NM CCO can also include RSRP, RSRQ, location info, IP throughput, and the like. Moreover, the data to support NM CCO can include RLF reports, RCEF reports, and CQI/RI distribution.

To save the effort of data correlation at the NM layer and to avoid the privacy issues with minimization of drive test data, conversion of minimization of drive test data, like reference signal received power (RSRP) and reference signal received quality (RSRQ), into new performance measurements (PMs), and the reporting of these performance measurements to the NM, are discussed in third generation partnership project (3GPP) technical report (TR) 32.836, "Enhanced CCO Study," which is hereby incorporated herein by reference in its entirety.

However, some performance measurements, like RSRP and RSRQ histograms, may be defined with the purpose of supporting some very specific use cases. Such performance measurements are not necessarily triggered by the minimization of drive test functionality. Also, the triggers of measurement collection may also be different. For example, some cases may need periodic user equipment (UE) measurements, while other cases may just need event based UE measurements. For example, to support a downlink coverage map, histogram, use case, a full picture may be desired. Thus, it may be necessary to have the measurements report for all location tiles, which may imply measurement collection from every connected UE. The UE periodic trigger for measurements collection may be appropriate for this case.

For some other cases, for example addressing the cell edge, reports may be only needed from some certain UEs whose measurements met the thresholds conditions. For such cases, event based trigger for measurements collection with certain thresholds may be appropriate.

Thus, by converting the minimization of drive test data into performance measurements, the final results an operator gets may be a mixture of measurements collected with periodic and event based triggers, and the generated performance measurements may not be useful or optimal for both purposes. For example, by periodic collection the number of UEs with RSRP in range-1 (−60, −55) dbm is 4, in range-2 (−55, −50) dbm is 3, but if you set the threshold for event based collection above −55 dbm then you cannot get the reports in the same range, but it does not mean that the real number UEs in this range-1 is 0, and you may get value is 2 in event based measurement collection for range-2. If you mix them together you will get the value for this range-1 is 4, range-2 is 5, but they are comparable.

Trace Integration Reference Point (IRP) can be used for triggering the minimization of drive test measurements collection for conversion into PM. The trigger mechanism of minimization of drive test data collection, however, is not conventionally defined.

SUMMARY

According to certain embodiments, a method may include sending performance measurement job activation indicating that minimization of drive test data is to be collected (in an alternative, the job can be configured to indicate that non-MDT data is to be collected). The method may also include receiving performance measurements in response to the job activation.

In certain embodiments, a method may include receiving performance measurement job activation via a performance measurement interface from a manager indicating that an agent is to collect minimization of drive test data. The method may also include performing performance measurement collection with respect to a network element. The method may further include receiving performance measurements or measurement reports from the network element. The method may additionally include providing the performance measurements to the manager.

A method, according to certain embodiments, may include receiving a request for performance measurements from an agent. The method may also include receiving measurement reports of minimization of drive test data corresponding to a plurality of user equipment. The method may further include converting user equipment measurement reports to performance measurements. The method may additionally include transmitting the performance measurements to the agent.

An apparatus, in certain embodiments, may include at least one processor and at least one memory including computer program code. The at least one memory and the computer program code can be configured to, with the at least one processor, cause the apparatus at least to send performance measurement job activation indicating that minimization of drive test data is to be collected (in an alternative, the job can be configured to indicate that non-MDT data is to be collected). The at least one memory and the computer program code can also be configured to, with the at least one processor, cause the apparatus at least to receive performance measurements in response to the job activation.

According to certain embodiments, an apparatus can include at least one processor and at least one memory including computer program code. The at least one memory and the computer program code can be configured to, with the at least one processor, cause the apparatus at least to receive performance measurement job activation via a PM interface from a manager indicating that an agent is to collect minimization of drive test data. The at least one memory and the computer program code can also be configured to, with the at least one processor, cause the apparatus at least to perform performance measurement collection with respect to a network element. The at least one memory and the computer program code can further be configured to, with the at least one processor, cause the apparatus at least to receive performance measurements or measurement reports from the network element. The at least one memory and the computer program code can additionally be configured to, with the at least one processor, cause the apparatus at least to provide the performance measurements to the manager.

In certain embodiments, an apparatus can include at least one processor and at least one memory including computer program code. The at least one memory and the computer program code can be configured to, with the at least one processor, cause the apparatus at least to receive a request for performance measurements from an agent. The at least one memory and the computer program code can also be configured to, with the at least one processor, cause the apparatus at least to receive measurement reports of minimization of drive test data corresponding to a plurality of user equipment. The at least one memory and the computer program code can further be configured to, with the at least one processor, cause the apparatus at least to convert user equipment measurement reports to performance measurements. The at least one memory and the computer program code can additionally be configured to, with the at least one processor, cause the apparatus at least to transmit the performance measurements to the agent.

An apparatus, according to certain embodiments, may include means for sending performance measurement job activation indicating that minimization of drive test data is to be collected (in an alternative, the job can be configured to indicate that non-MDT data is to be collected). The apparatus may also include means for receiving performance measurements in response to the job activation.

An apparatus, in certain embodiments, can include means for receiving performance measurement job activation via a PM interface from a manager indicating that an agent is to collect minimization of drive test data. The apparatus can also include means for performing performance measurement collection with respect to a network element. The apparatus can also include means for receiving performance measurements or measurement reports from the network element. The apparatus can further include means for providing the performance measurements to the manager.

According to certain embodiments, an apparatus may include means for receiving a request for performance measurements from an agent. The apparatus may also include means for receiving measurement reports of minimization of drive test data corresponding to a plurality of user equipment. The apparatus may further include means for converting user equipment measurement reports to performance measurements. The apparatus may additionally include means for transmitting the performance measurements to the agent.

In certain embodiments, a computer-readable medium (for example, a signal or a non-transitory computer readable medium) can be encoded with instructions that, when executed in hardware, perform a process. The process can include sending performance measurement job activation indicating that minimization of drive test data is to be collected (in an alternative, the job can be configured to indicate that non-MDT data is to be collected). The process can also include receiving performance measurements in response to the job activation.

A computer-readable medium (for example, a signal or a non-transitory computer readable medium), according to certain embodiments, can be encoded with instructions that, when executed in hardware, perform a process. The process can include receiving performance measurement job activation via a PM interface from a manager indicating that an agent is to collect minimization of drive test data. The process can also include performing performance measurement collection with respect to a network element. The process can further include receiving performance measurements or measurement reports from the network element. The process can additionally include providing the performance measurements to the manager.

A computer-readable medium (for example, a signal or a non-transitory computer readable medium), in certain embodiments, may be encoded with instructions that, when executed in hardware, perform a process. The process can include receiving a request for performance measurements from an agent. The process can also include receiving measurement reports of minimization of drive test data corresponding to a plurality of user equipment. The process can further include converting user equipment measurement reports to performance measurements. The process can additionally include transmitting the performance measurements to the agent.

A system according to certain embodiments may include a first apparatus, a second apparatus, and a third apparatus. The first apparatus may include means for sending performance measurement job activation indicating that minimization of drive test data is to be collected (in an alternative, the job can be configured to indicate that non-MDT data is to be collected). The first apparatus may also include means for receiving performance measurements in response to the job activation. The second apparatus may include means for receiving performance measurement job activation from the first apparatus indicating that the second apparatus is to collect minimization of drive test data. The second apparatus may also include means for performing performance measurement collection with respect to the third apparatus. The second apparatus may further include means for receiving performance measurements or measurement reports from the third apparatus. The second apparatus may additionally include means for providing the performance measurements to the first apparatus. The third apparatus may include means for receiving a request for performance measurements from the second apparatus. The third apparatus may also include means for receiving measurement reports of minimization of drive test data corresponding to a plurality of user equipment. The third apparatus may further include means for converting user equipment measurement reports to performance measurements. The third apparatus may additionally include means for transmitting the performance measurements to the second apparatus.

BRIEF DESCRIPTION OF THE DRAWINGS

For proper understanding of the invention, reference should be made to the accompanying drawings, wherein.

DETAILED DESCRIPTION

Certain embodiments provide a mechanism to trigger the collection of data for coverage and capacity optimization (CCO) over the interface Itf-N, in order to ensure that the data can be used by corresponding use cases respectively. The interface Itf-N can connect a network manager (NM) with a subordinate entity, which may be an element manager (EM) or a network element (NE), as described in 3GPP technical specification (TS) 32.600 V10.0.0, which is hereby incorporated herein by reference in its entirety.

Figure 7:
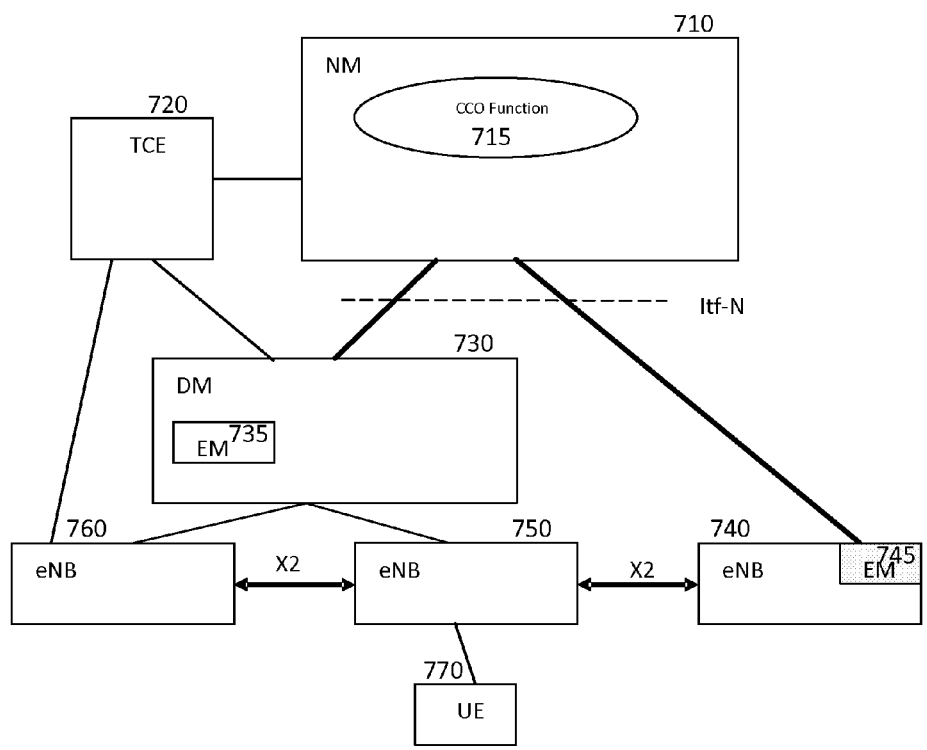
FIG. 7 illustrates a system architecture.

FIG. 7 illustrates an architecture of a system that may be used in connection with certain embodiments. As shown in FIG. 7, a network manager (NM) 710 may include a CCO function 715. Moreover, NM 710 may be connected to task control element (TCE) 720. NM 710 may also be connected, via interface Itf-N, to domain manager (DM) 730, which may include an element manager 735, and to eNB 740, which may include an element manager 745.

DM 730 and eNB 740 can each be connected to eNB 750. The connection between eNB 740 and eNB 750 may be an X2 interface. Likewise, eNB 750 can be connected to eNB 760 over an X2 interface. The TCE 720 can be connected to DM 730 and eNB 760. Moreover, DM 730 may be connected to eNB 750 and eNB 760. Each of the eNBs may be connected to one or more UE. For example, eNB 750 is illustrated as connected to UE 770.

Figure 1:
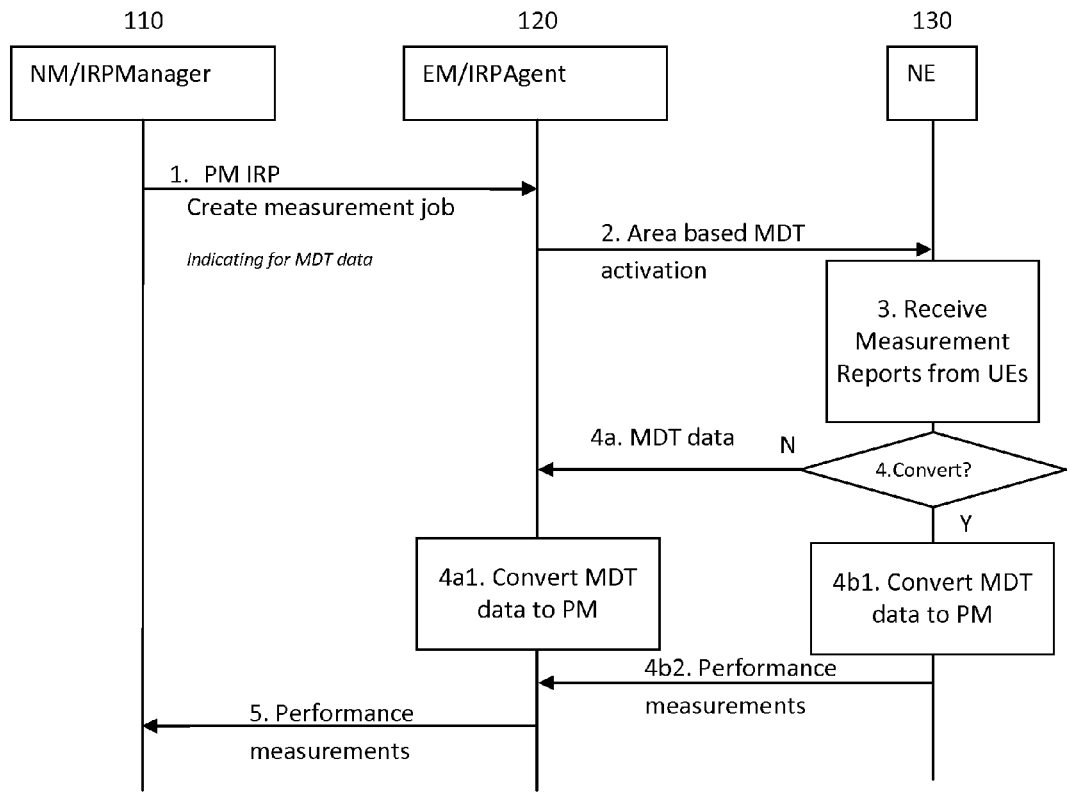
FIG. 1 illustrates a performance measurement (PM) Interface Reference Point (IRP) being used to collect performance measurements converted from minimization of drive test (MDT) data, according to certain embodiments.

According to a first embodiment, measurement triggering can be performed via area-based minimization of drive test activation. FIG. 1 illustrates a performance measurement (PM) Integration Reference Point (IRP) being used to collect performance measurements converted from minimization of drive test (MDT) data.

As shown in FIG. 1, at 1, NM/IRPManager 110 can create a measurement job via a performance measurement interface, indicating it is to collect minimization of drive test data. This may be done, for example, by tagging ".MDT" in the measurement name or by selecting a standardized measurement implying that minimization of drive test data will be used. Other ways of indicating are also permitted.

At 2, the EM/IRPAgent 120 can recognize that PM measurement requires minimization of drive test data collection or per-UE minimization of drive test network-side data collection. Specific minimization of drive test measurements may be standardized as part of the PM. The EM/IRPAgent 120 can activate area-based minimization of drive test jobs with one or more NE 130. The activation can follow a proprietary format. The minimization of drive test job activation may indicate that the raw minimization of drive test data is not needed at the task control element (TCE) and is to be converted into PMs. Another option may be normal area-based minimization of drive test activation with EM specified as TCE.

At 3, the NE 130 can collect minimization of drive test data from UE, including sending measurement configuration, for example periodic measurements collection, to UEs and receiving measurements reports from UEs.

At 4, the NE 130 may or may not be able to convert the minimization of drive test data to PM, depending for example on the implementation. If the NE 130 can convert the MDT data, then the process may proceed to 4b1, but otherwise it may proceed to 4a.

At 4a, the NE 130 can send the raw minimization of drive test data to EM/IRPAgent 120. This can be considered normal NE 130 behavior for an area-based minimization of drive test job. A full anonymization option may need to be selected to avoid communication between NE 130 and a mobility management entity (MME) for each new trace recording session.

At 4a1, EM/IRPAgent 120 can convert the minimization of drive test data to PM. Alternatively, at 4b1, NE 130 can convert the minimization of drive test data to PM. Then, at 4b2 the NE 130 can send the performance measurements converted from minimization of drive test data.

At 5, the EM/IRPAgent 120 can send the performance measurements converted from minimization of drive test data to the NM/IRPManager 110.

Figure 2:
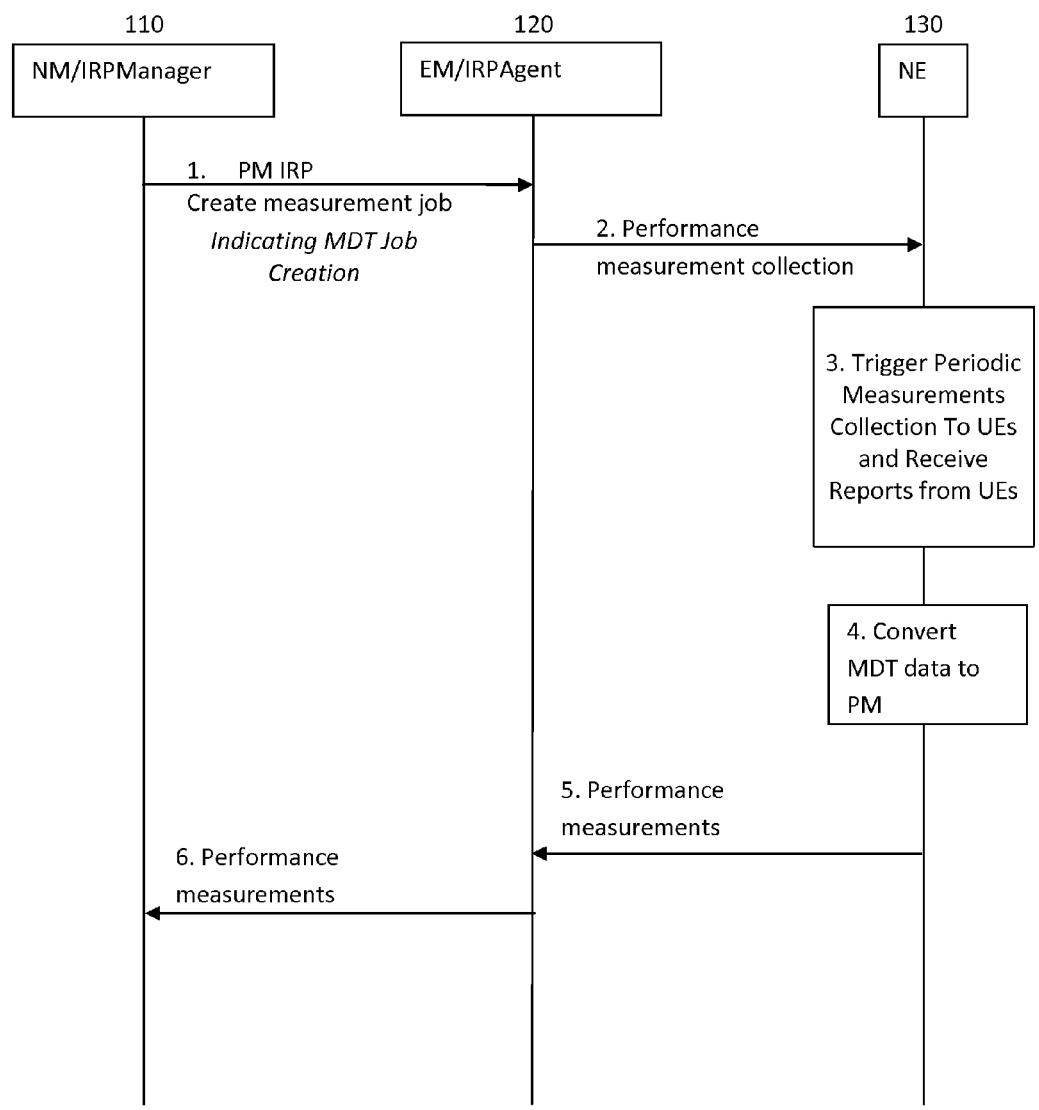
FIG. 2 illustrates a performance measurement interface being used to collect performance measurements converted from MDT data, according to certain further embodiments.

In a second embodiment, measurement triggering can be via measurement job creation. FIG. 2 illustrates a performance measurement interface being used to collect performance measurements converted from MDT data, according to certain further embodiments.

As shown in FIG. 2, at 1, NM/IRPManager 110 can create a measurement job via a performance measurement interface, indicating minimization of drive test data is to be collected. This indication may be done, as mentioned above, by tagging ".MDT" in the measurement name or by selecting a standardized measurement implying that minimization of drive test data will be used.

At 2, EM/IRPAgent 120 can send the measurements job to one or more NE 130. The NE 130 can, at 3, recognize that the specific measurement specified in the measurement job requires minimization of drive test data collection from the UEs or per UE minimization of drive test network side data collection. The specific minimization of drive test measurements may be standardized as part of the PM. The NE 130 can trigger either periodic measurements collection or event triggered measurement collection to all connected UEs in the collection period and can receive the measurements reports from UEs.

At 4, NE 130 can convert the minimization of drive test data to PM. The NE 130 can, at 5, send the raw measurements from UEs or can send performance measurements based on the raw measurements to EM/IRPAgent 120. Finally, the EM/IRPAgent 120 can send the performance measurements to NM/IRPManager 110.

The following is an example performance measurement definition to identify that the performance measurement is converted from minimization of drive test data. The definition is an option of certain embodiments, and is simply one example of a definition that may be used. This definition can be directed to RSRP related measurements converted from minimization of drive test data.

The measurement can be defined as providing the distribution of evolved UTRAN (E-UTRAN) RSRP. This measurement can be converted from minimization of drive test data (RSRP) by periodic collection of UE measurements. This measurement may only count the periodic measurement reports from UEs rather than the event based measurement reports.

The measurement can be defined in terms of a cumulative counter (CC). Other counter types are also permitted, as discussed in 3GPP TS 32.404, the entirety of which is hereby incorporated herein by reference.

Receipt by the eNodeB of minimization of drive test data report can be defined to be via a MeasurementReport message indicating a periodic UE measurement report, in which an information element (IE) MeasResults field includes rsrpResult. This measurement can be increased for each reported value RSRP_LEV, similar to what is discussed in 3GPP TS 36.331, which is hereby incorporated herein by reference in its entirety. This measurement shall be increased for each reported value RSRP_LEV. For example, for every one or two or 17 or 20 RSRP_LEV(s) a separate measurement can be defined similarly to what is discussed in 3GPP TS 36.214, which is hereby incorporated herein by reference in its entirety.

Each measurement can be defined to be an integer value. Moreover, the respective measurement reports can be defined as MR.Rsrp.y, where y is an integer from 00 to 47. For example, 00 of y can indicate from RSRP_LEV_00 to RSRP_LEV_LEV_20, namely RSRP<−120 dBm. Likewise, 01 of y can indicate RSRP_LEV_21 and RSRP_LEV_25, namely −120≤RSRP<−115 dBm, 02 of y can indicate RSRP_LEV_26, namely −115≤RSRP<−114 dBm, and 03 of y can indicate RSRP_LEV_27, namely −114≤RSRP<−113 dBm. This series can similarly continue on. For example, 36 of y can indicate RSRP_LEV_60, namely −81≤RSRP<−80 dBm, 37 of y can indicate RSRP_LEV_61, RSRP_LEV_62, namely −80≤RSRP<−78 dBm, and 38 of y can indicate RSRP_LEV_63, RSRP_LEV_64, namely −78≤RSRP<−76 dBm. Finally, 46 of y can indicate from RSRP_LEV_79 to RSRP_LEV_80, namely −62≤RSRP<−60 dBm and 47 of y can indicate from RSRP_LEV_81 to RSRP_LEV_97, namely −60 dBm≤RSRP. These definitions may, for example, be informed by 3GPP TS 36.133, which is hereby incorporated herein by reference in its entirety.

The measurement can also be defined with respect to EUtranGenericCell. The measurement can be performed at a particular object level, as defined in the NRM Network Resource Model. This particular measurement definition example specifies measurement to be performed at the cell, LTE Cell=EUtranGenericCell object, level.

The measurement report can be defined to be valid for packet switched traffic. Furthermore, the measurement report can be defined with respect to the evolved packet system (EPS).

Figure 3:
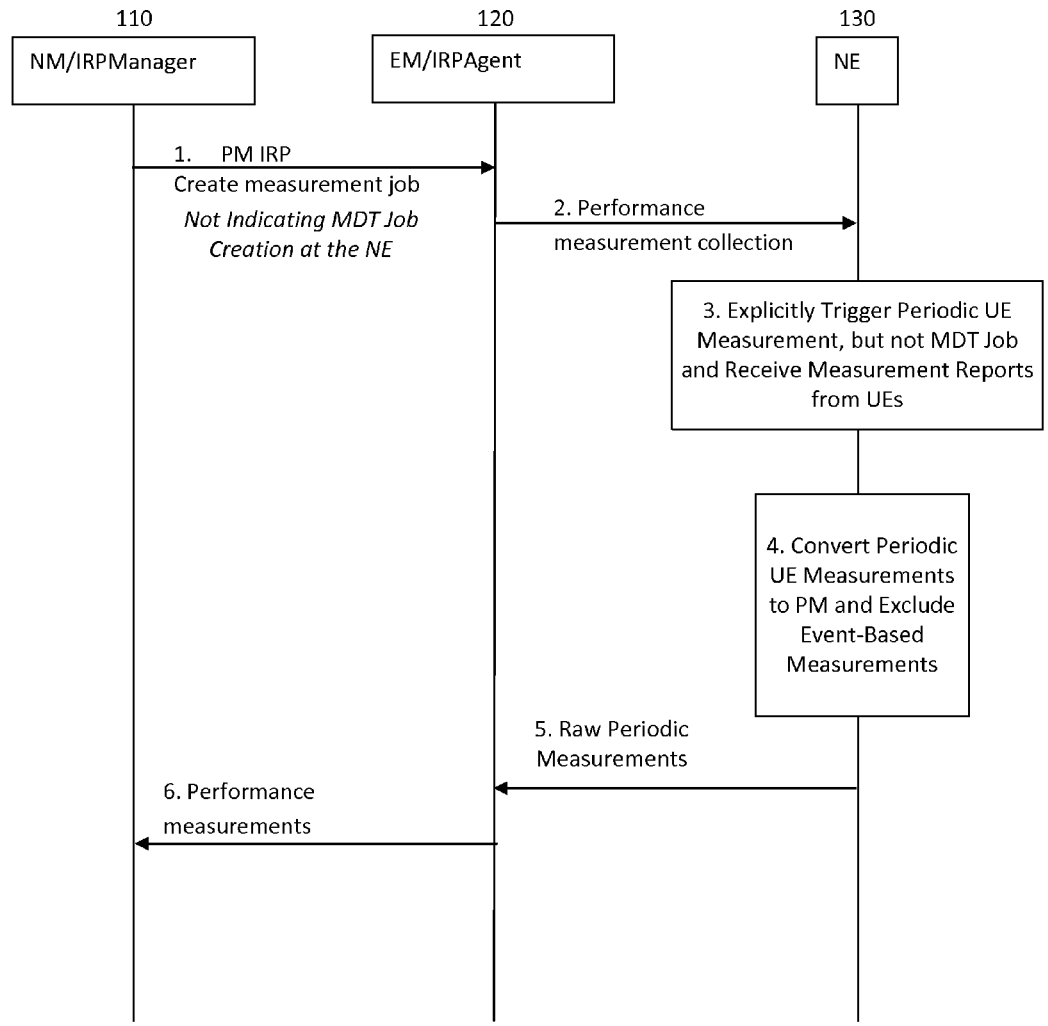
FIG. 3 illustrates a performance measurement interface being used to collect performance measurements converted from MDT data, according to additional embodiments.

In a third embodiment, there may be explicit triggering of UE measurements without MDT job creation at the NE. FIG. 3 illustrates a performance measurement interface being used to trigger the UE measurements and to collect performance measurements converted from UE measurements data, according to additional embodiments.

As shown in FIG. 3, at 1, the NM/IRPManager 110 can create a measurement job via a performance measurement interface, indicating minimization of drive test data is not to be collected or that something other than minimization of drive test data is to be collected. This may be done, for example, by tagging ".Non-MDT" in the measurement name.

At 2, EM/IRPAgent 120 can send the measurements job to at least one NE 130. Then, at 3, NE 130 may explicitly trigger the periodic UE measurements collection to all connected UEs in the collection period, but not the MDT job. However, the NE 130 may receive the measurements reports from UEs that were configured/triggered for other, non-MDT purposes, for example, mobility robustness optimization (MRO), handover (HO), or the like.

At 4, the NE 130 can convert the periodic UE measurements received from the UEs into PM and exclude the event based UE measurements. Then, at 5, the NE 130 can send the raw periodic measurements from UEs, or can send the performance measurements based on the raw measurements to EM/IRPAgent 120.

Finally, at 6, the EM/IRPAgent 120 can send the performance measurements to NM/IRPManager 110. Thus, in certain cases, the EM/IRPAgent 120 can convert the raw measurements from the UEs into PMs, as at 4a1 in FIG. 1.

Certain embodiments may have various benefits or advantages. For example, certain embodiments may be able to reuse performance measurement interface over Itf-N, without need to increase complexity of trace IRP. Thus, certain embodiments may avoid any problems related to trace IRP re-use. Furthermore, certain embodiments may avoid any need to report the minimization of drive test data, which may have privacy issues, to TCE anymore. Thus, privacy issues with minimization of drive test data can be resolved. Additionally, the periodic measurements can be analyzed separately from event based measurements, thus the result may be more reliable.

Figure 4:
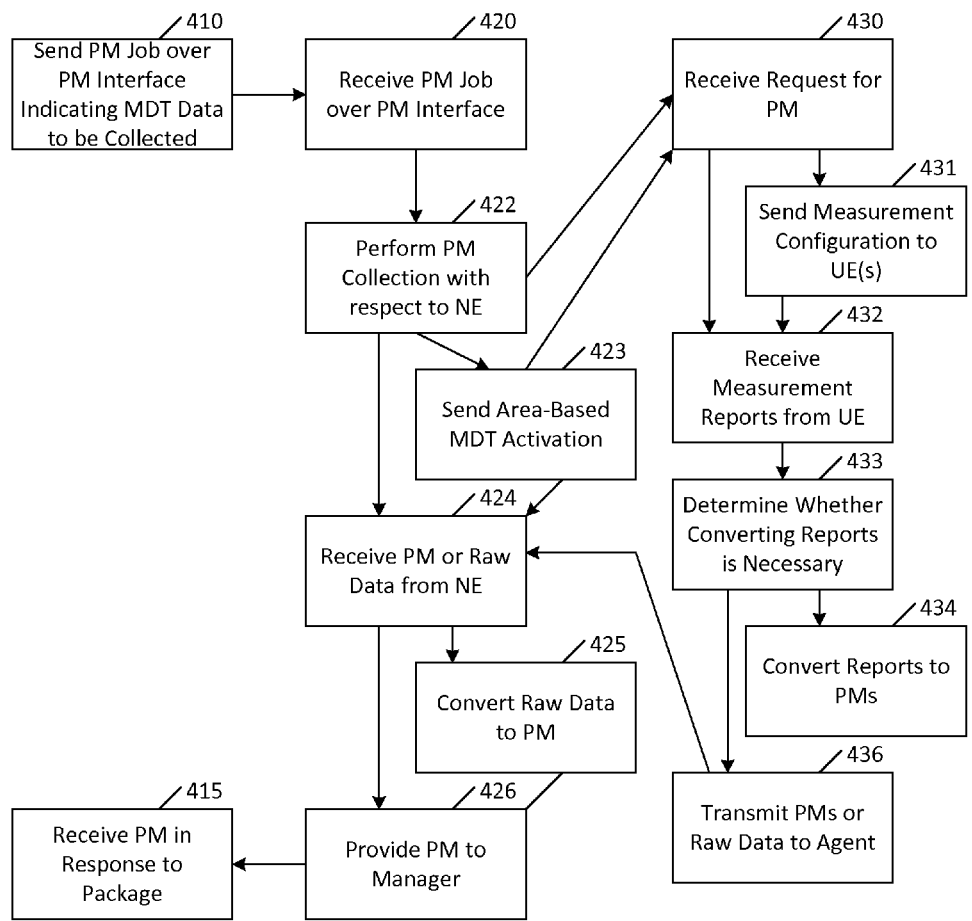
FIG. 4 illustrates a method according to certain embodiments.

FIG. 4 illustrates a method according to certain embodiments. As shown in FIG. 4, the method can include, at 410, sending performance measurement job activation via a performance measurement interface from a manager indicating that minimization of drive test data is to be collected. The method can also include, at 415, receiving performance measurements in response to the activation.

The method can further include, at 420, receiving performance measurement job activation via a PM interface from a manager indicating that an agent is to collect minimization of drive test data.

The method can also include, at 422, performing performance measurement collection with respect to a network element. For example, the measurement collection can be a collection of measurements of UEs associated with the network element. This can be performed by communicating with the network element, rather than by communicating directly with the UEs. The network element can be an access point, such as a base station or eNode B (eNB). Thus, for example, the performing performance measurement collection can include, at 423, sending an area-based minimization of drive test activation to the network element.

Moreover, the method can further include, at 424, receiving performance measurements or measurement reports from the network element. The measurement reports may be raw measurement data. When receiving measurement reports from the network element, the method can also include, at 425, converting the measurement reports into the performance measurements.

Additionally, the method can also include, at 426, providing the performance measurements to the manager. These may be the performance measurements received from the NE or performance measurements calculated or otherwise converted based on raw measurements provided by the NE.

The method may also include, at 430, receiving a request for performance measurements from an agent. This request may take various forms, such as an area-based MDT activation. Other forms are also possible.

In response to this request, the NE optionally may specifically trigger measurement reports from the UEs. For example, the NE can send, at 431, a measurement configuration selected from a periodic measurement collection to at least one user equipment of the plurality of user equipment. The measurement configuration can be sent to all user equipment connected to a network element performing the method.

Moreover, the NE can receive, at 432, measurement reports of minimization of drive test data corresponding to a plurality of user equipment.

Then, at 434, the NE can convert user equipment measurement reports to performance measurements. This converting can be performed conditionally upon determining, at 433, that a network element is configured to convert the measurement reports. If the converting is not needed, it may be omitted. At 436, the NE can transmit the performance measurements or raw measurement data to the agent.

Figure 5:
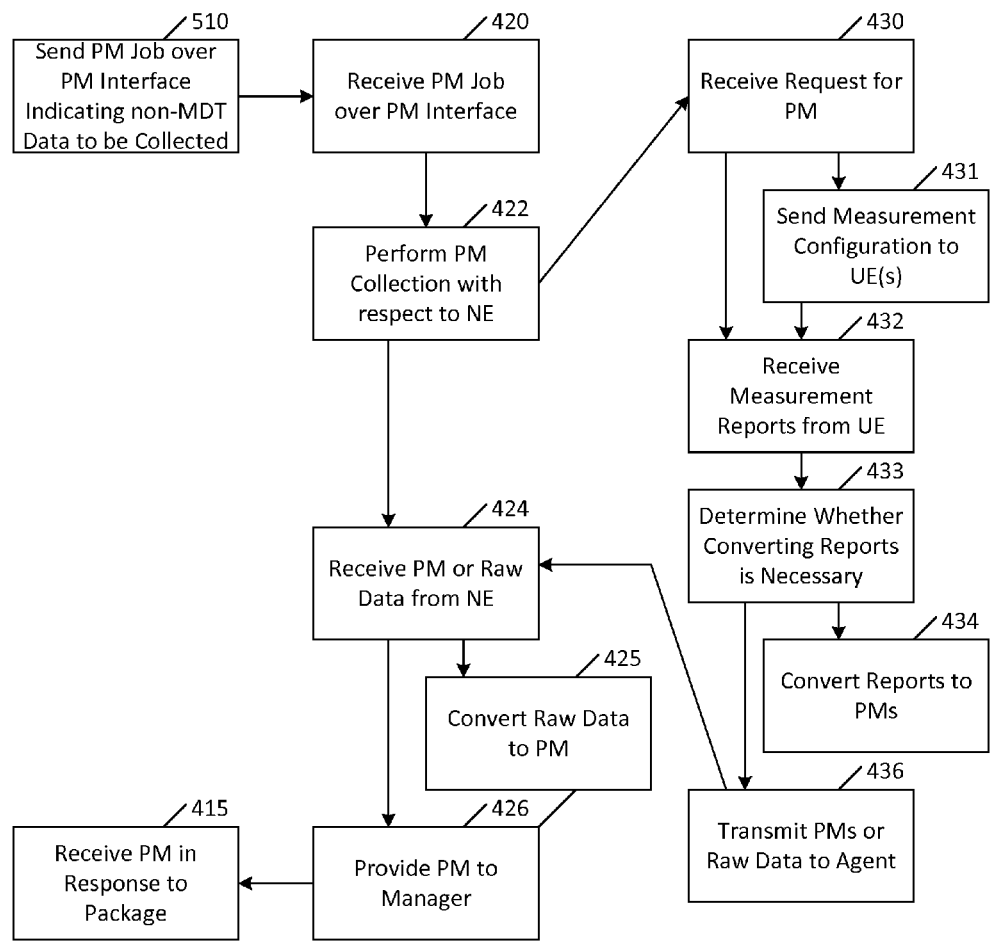
FIG. 5 illustrates another method according to certain embodiments.

FIG. 5 illustrates another method according to certain embodiments. The method of FIG. 5 may be largely similar to the method of FIG. 4, but there may be no explicit indication that MDT is desired, or specifically there may be an indication that MDT data is not desired. Thus, at 510, a PM job via a performance measurement interface may be sent indicating that non-MDT data is to be collected.

Figure 6:
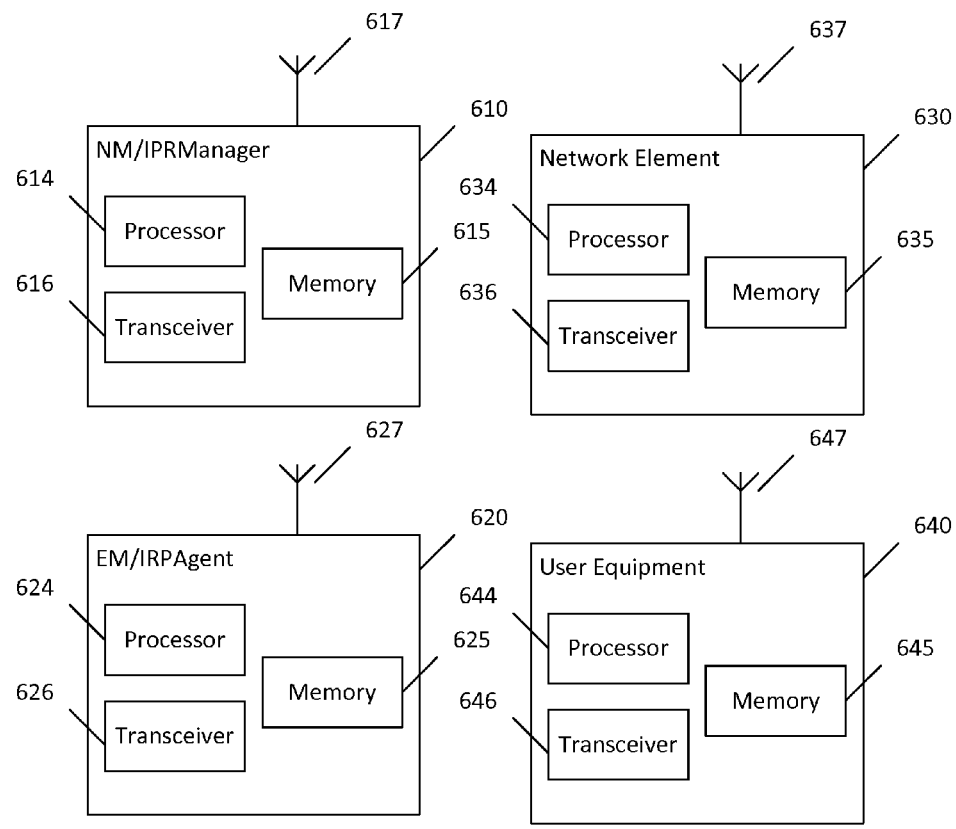
FIG. 6 illustrates a system according to certain embodiments of the invention.

FIG. 6 illustrates a system according to certain embodiments of the invention. In one embodiment, a system may include several devices, such as, for example, NM/IRPManager 610, EM/IRPAgent 620, network element 630, and user equipment 640. The system may include more than one EM/IRPAgent 620 and more than one NM/IRPManager 610, although only one of each is shown for the purposes of illustration. Each of these devices may include at least one processor, respectively indicated as 614, 624, 634, and 644. At least one memory may be provided in each device, and indicated as 615, 625, 635, and 645, respectively. The memory may include computer program instructions or computer code contained therein. One or more transceiver 616, 626, 636, and 646 may be provided, and each device may also include an antenna, respectively illustrated as 617, 627, 637, and 647. Although only one antenna each is shown, many antennas and multiple antenna elements may be provided to each of the devices. Other configurations of these devices, for example, may be provided. For example, NM/IRPManager 610, EM/IRPAgent 620, network element 630, and user equipment 640 may be additionally or solely configured for wired communication. In such a case antennas 617, 627, 637, and 647 may illustrate any form of communication hardware, without being limited to merely an antenna. For example, antennas 617, 627, 637, and 647 may illustrate any form of wired communication hardware, such as a network interface card.

Transceivers 616, 626, 636, and 646 may each, independently, be a transmitter, a receiver, or both a transmitter and a receiver, or a unit or device that may be configured both for transmission and reception.

Processors 614, 624, 634, and 644 may be embodied by any computational or data processing device, such as a central processing unit (CPU), application specific integrated circuit (ASIC), or comparable device. The processors may be implemented as a single controller, or a plurality of controllers or processors.

Memories 615, 625, 635, and 645 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language.

The memory and the computer program instructions may be configured, with the processor for the particular device, to cause a hardware apparatus such as NM/IRPManager 610, EM/IRPAgent 620, network element 630, and user equipment 640, to perform any of the processes described above (see, for example, FIGS. 1-5). Therefore, in certain embodiments, a non-transitory computer-readable medium may be encoded with computer instructions that, when executed in hardware, may perform a process such as one of the processes described herein. Alternatively, certain embodiments of the invention may be performed entirely in hardware.

Furthermore, although FIG. 6 illustrates a system including NM/IRPManager 610, EM/IRPAgent 620, network element 630, and user equipment 640, embodiments of the invention may be applicable to other configurations, and configurations involving additional elements, as illustrated and discussed herein (see, for example, FIGS. 1-5).

Various embodiments are possible. For example, as mentioned above, according to certain embodiments, a method may include sending performance measurement job activation indicating that minimization of drive test data is to be collected (in an alternative, the job can be configured to indicate that non-MDT data is to be collected). The method may also include receiving performance measurements in response to the job activation.

In certain embodiments, a method may include receiving performance measurement job activation via a performance measurement interface from a manager indicating that an agent is to collect minimization of drive test data. The method may also include performing performance measurement collection with respect to a network element. The method may further include receiving performance measurements or measurement reports from the network element. The method may additionally include providing the performance measurements to the manager.

In a variation, the method may also include, when receiving measurement reports from the network element, converting the measurement reports into the performance measurements.

In a variation, performing performance measurement collection can include sending an area-based minimization of drive test activation to the network element.

A method, according to certain embodiments, may include receiving a request for performance measurements from an agent. The method may also include receiving measurement reports of minimization of drive test data corresponding to a plurality of user equipment. The method may further include converting user equipment measurement reports to performance measurements. The method may additionally include transmitting the performance measurements to the agent.

In a variation, the converting can be performed conditionally upon determining that a network element is configured to convert the measurement reports.

In a variation, the method may further include sending a measurement configuration selected from a periodic measurement collection to at least one user equipment of the plurality of user equipment.

In a variation, the measurement configuration can be sent to all user equipment connected to a network element performing the method.

In a variation, the method may further comprise excluding event based triggered measurements received from the UEs. For example, only periodically triggered measurement reports from the UEs may be included, in certain embodiments.

An apparatus, in certain embodiments, may include at least one processor and at least one memory including computer program code. The at least one memory and the computer program code can be configured to, with the at least one processor, cause the apparatus at least to send performance measurement job activation indicating that minimization of drive test data is to be collected (in an alternative, the job can be configured to indicate that non-MDT data is to be collected). The at least one memory and the computer program code can also be configured to, with the at least one processor, cause the apparatus at least to receive performance measurements in response to the job activation.

According to certain embodiments, an apparatus can include at least one processor and at least one memory including computer program code. The at least one memory and the computer program code can be configured to, with the at least one processor, cause the apparatus at least to receive performance measurement job activation via a PM interface from a manager indicating that an agent is to collect minimization of drive test data. The at least one memory and the computer program code can also be configured to, with the at least one processor, cause the apparatus at least to perform performance measurement collection with respect to a network element. The at least one memory and the computer program code can further be configured to, with the at least one processor, cause the apparatus at least to receive performance measurements or measurement reports from the network element. The at least one memory and the computer program code can additionally be configured to, with the at least one processor, cause the apparatus at least to provide the performance measurements to the manager.

In a variation, the at least one memory and the computer program code can be configured to, with the at least one processor, cause the apparatus at least to, when receiving measurement reports from the network element, convert the measurement reports into the performance measurements.

In a variation, the at least one memory and the computer program code can be configured to, with the at least one processor, cause the apparatus at least to perform the performance measurement collection by sending an area-based minimization of drive test activation to the network element.

In certain embodiments, an apparatus can include at least one processor and at least one memory including computer program code. The at least one memory and the computer program code can be configured to, with the at least one processor, cause the apparatus at least to receive a request for performance measurements from an agent. The at least one memory and the computer program code can also be configured to, with the at least one processor, cause the apparatus at least to receive measurement reports of minimization of drive test data corresponding to a plurality of user equipment. The at least one memory and the computer program code can further be configured to, with the at least one processor, cause the apparatus at least to convert user equipment measurement reports to performance measurements. The at least one memory and the computer program code can additionally be configured to, with the at least one processor, cause the apparatus at least to transmit the performance measurements to the agent.

In a variation, the at least one memory and the computer program code can be configured to, with the at least one processor, cause the apparatus at least to convert conditionally upon determining that a network element is configured to convert the measurement reports.

In a variation, the at least one memory and the computer program code are configured to, with the at least one processor, cause the apparatus at least to send a measurement configuration selected from a periodic measurement collection to at least one user equipment of the plurality of user equipment.

In a variation, the at least one memory and the computer program code can be configured to, with the at least one processor, cause the apparatus at least to send the measurement configuration to all user equipment connected to the apparatus.

In a variation, the at least one memory and the computer program code can be configured to, with the at least one processor, cause the apparatus at least to exclude event based triggered measurements received from the UEs.

An apparatus, according to certain embodiments, may include means for sending performance measurement job activation indicating that minimization of drive test data is to be collected (in an alternative, the job can be configured to indicate that non-MDT data is to be collected). The apparatus may also include means for receiving performance measurements in response to the job activation.

An apparatus, in certain embodiments, can include means for receiving performance measurement job activation via a PM interface from a manager indicating that an agent is to collect minimization of drive test data. The apparatus can also include means for performing performance measurement collection with respect to a network element. The apparatus can also include means for receiving performance measurements or measurement reports from the network element. The apparatus can further include means for providing the performance measurements to the manager.

In a variation, the apparatus may also include means for, when receiving measurement reports from the network element, converting the measurement reports into the performance measurements.

In a variation, the performing performance measurement collection comprises sending an area-based minimization of drive test activation to the network element.

According to certain embodiments, an apparatus may include means for receiving a request for performance measurements from an agent. The apparatus may also include means for receiving measurement reports of minimization of drive test data corresponding to a plurality of user equipment. The apparatus may further include means for converting user equipment measurement reports to performance measurements. The apparatus may additionally include means for transmitting the performance measurements to the agent.

In a variation, the converting can be performed conditionally upon determining that a network element is configured to convert the measurement reports.

In a variation, the apparatus can further include means for sending a measurement configuration selected from a periodic measurement collection to at least one user equipment of the plurality of user equipment.

In a variation, the measurement configuration can be sent to all user equipment connected to the apparatus.

In a variation, the apparatus may further comprise means for excluding event based triggered measurements received from the UEs.

In certain embodiments, a computer-readable medium (for example, a signal or a non-transitory computer readable medium) can be encoded with instructions that, when executed in hardware, perform a process. The process can include sending performance measurement job activation indicating that minimization of drive test data is to be collected (in an alternative, the job can be configured to indicate that non-MDT data is to be collected). The process can also include receiving performance measurements in response to the job activation.

A computer-readable medium (for example, a signal or a non-transitory computer readable medium), according to certain embodiments, can be encoded with instructions that, when executed in hardware, perform a process. The process can include receiving performance measurement job activation via a PM interface from a manager indicating that an agent is to collect minimization of drive test data. The process can also include performing performance measurement collection with respect to a network element. The process can further include receiving performance measurements or measurement reports from the network element. The process can additionally include providing the performance measurements to the manager.

In a variation, the process may further include, when receiving measurement reports from the network element, converting the measurement reports into the performance measurements.

In a variation, the performing performance measurement collection may include sending an area-based minimization of drive test activation to the network element.

A computer-readable medium (for example, a signal or a non-transitory computer readable medium), in certain embodiments, may be encoded with instructions that, when executed in hardware, perform a process. The process can include receiving a request for performance measurements from an agent. The process can also include receiving measurement reports of minimization of drive test data corresponding to a plurality of user equipment. The process can further include converting user equipment measurement reports to performance measurements. The process can additionally include transmitting the performance measurements to the agent.

In a variation, the converting can be performed conditionally upon determining that a network element is configured to convert the measurement reports.

In a variation, the process can further include sending a measurement configuration selected from a periodic measurement collection to at least one user equipment of the plurality of user equipment.

In a variation, the measurement configuration can be sent to all user equipment connected to a network element performing the process.

In a variation, the process may further comprise excluding event based triggered measurements received from the UEs.

The embodiments described above can be combined with one another in a system or combined method. The above variations can be used with one another, as desired.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

GLOSSARY

3GPP Third Generation Partnership Project
CCO Coverage and Capacity Optimization
DM Domain Manager
EDGE Enhanced Data rates for GSM Evolution
EM Element Manager
eNB evolved Node B
EPS Evolved Packet System
E-UTRAN Evolved UTRAN
GERAN GSM EDGE Radio Access Network
GSM Global System for Mobile Communication
HO Handover
IE Information Element
IRP Integration Reference Point
LTE Long Time Evolution
MDT Minimization of Drive Tests
MME Mobility Management Entity
MRO Mobility Robustness Optimization
NE Network Elements
NM Network Manager
PM Performance Management
RSRP Reference Signal Received Power
RSRQ Reference Signal Received Quality
SON Self-Organizing Networks
TCE Task Control Element
TR Technical Report
UTRAN Universal Terrestrial Radio Access Network
UE User Equipment

We claim:

1. A method, comprising:
   receiving at a network element a request for performance measurements from an agent;
   receiving at a network element measurement reports of minimization of drive test data corresponding to a plurality of user equipment, wherein the minimization of drive test data includes periodic-based triggered data and event-based triggered data;
   excluding the event-based triggered data received from the plurality of user equipment;
   converting user equipment measurement reports of the minimization of drive test data to performance measurements, which are periodic-based measurements; and
   transmitting the performance measurements from the network element to the agent according to an option configured to avoid communication between the network element and a mobility management entity for at least one new trace recording session.

2. The method of claim 1, wherein the converting is performed conditionally upon determining that the network element is configured to convert the measurement reports.

3. The method of claim 1, further comprising:
sending a measurement configuration selected from a periodic measurement collection to at least one user equipment of the plurality of user equipment from the network entity.

4. The method of claim 3, wherein the measurement configuration is sent to all of the plurality of user equipment connected to the network element performing the method.

5. An apparatus, comprising:
at least one processor, and
at least one memory including computer program code, wherein the at least one memory and the computer program code are configured to, with the at least one processor, cause the apparatus at least to:
receive at an agent a performance measurement job activation via a performance measurement (PM) interface from a manager indicating that the agent is to collect minimization of drive test data, wherein the minimization of drive test data includes periodic-based triggered data and event-based triggered data;
perform performance measurement collection with respect to a network element;
receive performance measurements, which are periodic-based measurements, or measurement reports of the minimization of drive test data from the network element, wherein the event-based triggered data is excluded from the measurement reports or the performance measurements according to an option configured to avoid communication between the network element and a mobility management entity for at least one new trace recording session; and
provide the periodic-based performance measurements to the manager.

6. The apparatus of claim 5, wherein the at least one memory and the computer program code are configured to, with the at least one processor, cause the apparatus at least to, convert the measurement reports into the performance measurements, which are periodic-based measurements, when receiving the measurement reports from the network element.

7. The apparatus of claim 5, wherein the at least one memory and the computer program code are configured to, with the at least one processor, cause the apparatus at least to perform collection of the performance measurements by sending an area-based minimization of drive test activation to the network element.

8. An apparatus, comprising:
at least one processor; and
at least one memory including computer program code, wherein the at least one memory and the computer program code are configured to, with the at least one processor, cause the apparatus at least to:
receive a request for performance measurements from an agent;
receive measurement reports of minimization of drive test data corresponding to a plurality of user equipment, wherein the minimization of drive test data includes periodic-based triggered data and event-based triggered data;
exclude the event-based triggered data received from the plurality of user equipment;
convert user equipment measurement reports of the minimization of drive test data to performance measurements, which are periodic-based measurements; and
transmit the performance measurements from the apparatus to the agent according to an option configured to avoid communication between the apparatus and a mobility management entity for at least one new trace recording session.

9. The apparatus of claim 8, wherein the at least one memory and the computer program code are configured to, with the at least one processor, cause the apparatus at least to convert conditionally upon determining that the apparatus is configured to convert the measurement reports.

10. The apparatus of claim 8, wherein the at least one memory and the computer program code are configured to, with the at least one processor, cause the apparatus at least to send a measurement configuration selected from a periodic measurement collection to at least one user equipment of the plurality of user equipment from the apparatus.

11. The apparatus of claim 10, wherein the at least one memory and the computer program code are configured to, with the at least one processor, cause the apparatus at least to send the measurement configuration to all of the plurality of user equipment connected to the apparatus.

12. An apparatus, comprising:
means for receiving a request for performance measurements from an agent;
means for receiving measurement reports of minimization of drive test data corresponding to a plurality of user equipment, wherein the minimization of drive test data includes periodic-based triggered data and event-based triggered data;
means for excluding the event-based triggered data received from the plurality of user equipment;
means for converting user equipment measurement reports of the minimization of drive test data to performance measurements, which are periodic-based measurements; and
means for transmitting the performance measurements from the apparatus to the agent according to an option configured to avoid communication between the apparatus and a mobility management entity for at least one new trace recording session.

13. The apparatus of claim 12, wherein the converting is performed conditionally upon determining that the apparatus is configured to convert the measurement reports.

14. The apparatus of claim 12, further comprising:
means for sending a measurement configuration selected from a periodic measurement collection to at least one user equipment of the plurality of user equipment from the apparatus.

15. The apparatus of claim 14, wherein the measurement configuration is sent to all of the plurality of user equipment connected to the apparatus.

16. A non-transitory computer-readable medium encoded with instructions that, when executed in hardware, perform a process, the process comprising the method according to claim 1.

17. A computer program product embodied on a non-transitory computer-readable medium, said computer program product encoding instructions for performing a process, the process comprising the method according to claim 1.

* * * * *